(12) United States Patent
Takahashi et al.

(10) Patent No.: US 6,605,896 B1
(45) Date of Patent: Aug. 12, 2003

(54) LOW PRESSURE MERCURY VAPOR DISCHARGE LAMP AND MANUFACTURING METHOD THEREFOR

(75) Inventors: Junichi Takahashi, Neyagawa (JP); Takeshi Matsumura, Kashiwara (JP); Masao Yukawa, Takatsuki (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/573,868

(22) Filed: May 18, 2000

(30) Foreign Application Priority Data

May 19, 1999 (JP) .............................. 11-138207

(51) Int. Cl.[7] .................................................. H01J 17/20
(52) U.S. Cl. ........................ 313/573; 313/493; 313/634
(58) Field of Search ................................. 313/573, 493, 313/634

(56) References Cited

U.S. PATENT DOCUMENTS 4,481,442 A * 11/1984 Albrecht et al. ............ 313/493
4,869,698 A    9/1989 Itou ............................ 455/22
4,977,349 A * 12/1990 Asakura et al. ............. 313/490
5,182,486 A *  1/1993 Itoh et al. ..................... 313/25
5,635,794 A *  6/1997 Koerfer ....................... 313/493

FOREIGN PATENT DOCUMENTS

| CA | 2096073 | 11/1993 |
| JP | 59132557 | 7/1984 |
| JP | 63187530 | 8/1988 |
| JP | 1186747 | 7/1989 |
| JP | 5250988 | 9/1993 |
| JP | 620650 | 6/1994 |
| JP | 1167149 | 3/1999 |

* cited by examiner

*Primary Examiner*—Robert H. Kim
*Assistant Examiner*—Jurie Yun

(57) ABSTRACT

A low pressure mercury vapor discharge lamp includes an arc tube in which one discharge path is formed by connecting a plurality of U-shaped glass tubes that are provided with a fluorescent layer at the internal surface. The arc tube is held by a holder and is enclosed into a globe. A lighting circuit is connected to the arc tube. The light circuit and the holder are enclosed into a case having a lamp cap. The globe and the case integrally form a housing. The outline of the sectional face of a U-shaped glass tube at the bent part includes a circular arc and a gentle curve.

10 Claims, 6 Drawing Sheets ratio of shortest internal diameter d1 of sectional face of U-shaped glass tube at bent part to internal diameter D at straight part Fig. 6A
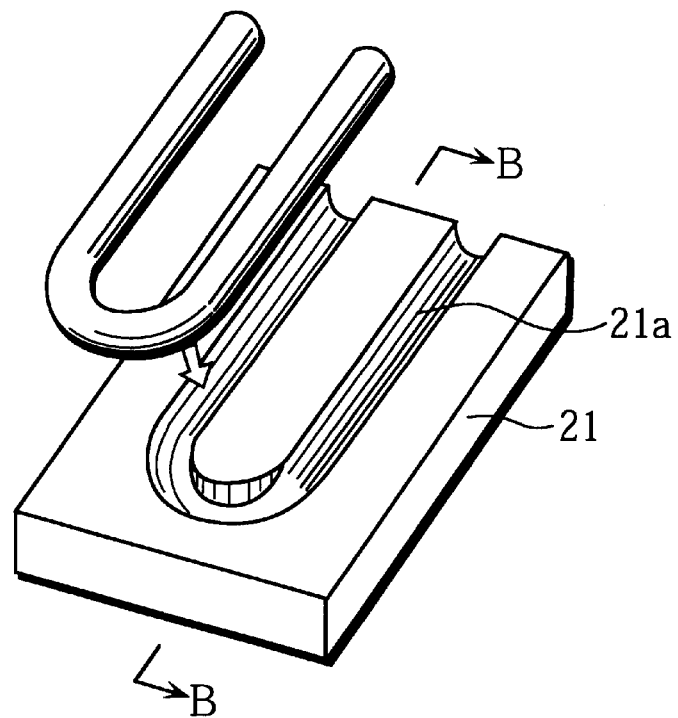
Fig. 6B
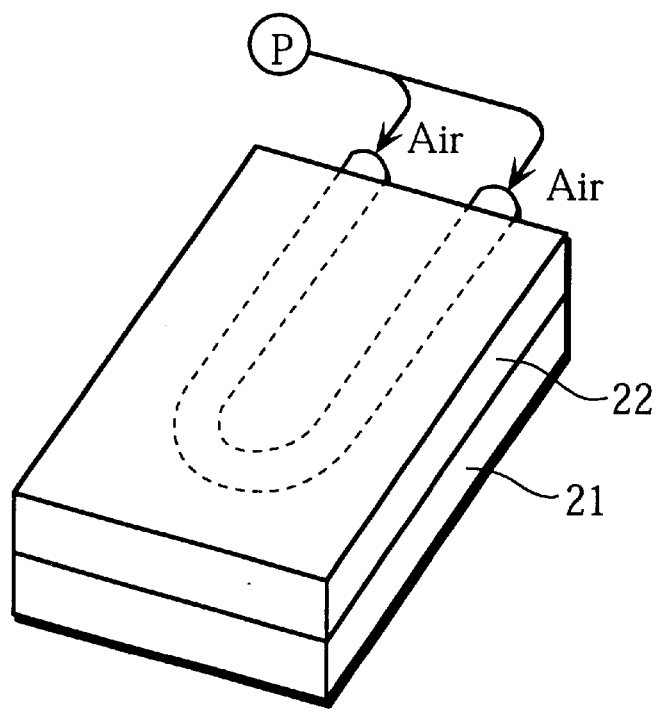
Fig. 6C

LOW PRESSURE MERCURY VAPOR DISCHARGE LAMP AND MANUFACTURING METHOD THEREFOR

This application is based on an application Ser. No. 11-138207 filed in Japan, the content of which is hereby incorporated by reference.

BACKGROUND OF THE INVENTION (1) Field of the Invention

The present invention relates to a low pressure mercury vapor discharge lamp that includes U-shaped glass tubes filled with mercury vapor.

(2) Prior Art

One kind of well-known low pressure mercury vapor discharge lamp includes an arc tube that is a plurality of connected glass tubes. In the arc tube, one discharge path is formed. This arc tube is enclosed in a glass globe or a plastic globe, and a lighting circuit is enclosed in a case with a lamp cap. A lamp whose housing is composed of the globe and the case is known as the bulb-shaped fluorescent lamp.

This fluorescent lamp is desired to be more compact so as to be small as the bulb. In addition, the fluorescent lamp is desired to be more efficient and have a longer life.

In consideration of the size and the maximum luminous efficiency of the fluorescent lamp, however, the glass tube diameter, the discharge path length, and the inter-electrode distance of the arc tube cannot be increased any more. Under the circumstances, the arc tube is desired to still improve the luminous efficiency.

SUMMARY OF THE INVENTION

It is accordingly an object of the present invention to provide a low pressure mercury vapor discharge lamp having improved luminous efficiency without upsizing the arc tube.

Another object of the present invention is to improve the luminous efficiency by devising the shape of the bent part of the U-shaped glass tube without upsizing the arc tube.

A further object of the present invention is to provide a low pressure mercury vapor discharge lamp that is preferable as a bulb-shaped fluorescent lamp.

Yet another object of the present invention is to provide a rational method for manufacturing a low pressure mercury vapor discharge lamp so as not to upsizing the arc tube and to improve the luminous efficiency.

The above-mentioned first and second objects may be achieved by a low pressure mercury vapor discharge lamp having a U-shaped glass tube characterized in that a part of an outline of a sectional face at a bent part of the U-shaped glass tube is a gentle curve.

In the low pressure mercury vapor discharge lamp, the inter-electrode distance, i.e., the discharge distance, which is one factor for the luminous efficiency, can be increased. As a result, the luminous efficiency can be improved without increasing the entire length of the arc tube.

The above-mentioned first and second objects may be also achieved by the low pressure mercury vapor discharge lamp, wherein the gentle curve is formed on a surface on an inner curve side of the U shape of the U-shaped glass tube.

The above-mentioned first and second objects may be also achieved by the low pressure mercury vapor discharge lamp, wherein a remaining part of the outline is a circular arc.

The above-mentioned first and second objects may be also achieved by the low pressure mercury vapor discharge lamp, wherein the gentle curve is approximately a chord.

The above-mentioned first and second objects may be also achieved by the low pressure mercury vapor discharge lamp, wherein the gentle curve satisfies an equation $0.5 < d1/D \leq 0.9$, a shortest internal diameter of the U-shaped glass tube at the bent part being $d1$, and an internal diameter of the U-shaped glass tube at a straight part being $D$.

The above-mentioned first and second objects may be also achieved by the low pressure mercury vapor discharge lamp, wherein the part of the sectional face outline at the bent part of the U-shaped glass tube on the surface on the inner curve side of the U shape of the U-shaped glass tube is a gentle curve.

The above-mentioned third object may be also achieved by the low pressure mercury vapor discharge lamp, wherein the U-shaped glass tubes have the same sectional face outline at bent parts.

The above-mentioned fourth object may be also achieved by a low pressure mercury vapor discharge lamp that includes a plurality of U-shaped glass tubes, wherein the U-shaped glass tubes are connected to each other so as to form a discharge path inside, and a part of an outline of a sectional face at a bent part of at least one of the U-shaped glass tubes is a gentle curve; a holder for holding an arc tube; a lighting circuit for applying lighting voltage to the arc tube held by the holder between ends of the discharge path; and a lamp cap that is integrated with the holder, the lamp cap connecting the lighting circuit to an external power.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 6 is a drawing illustrating the method of manufacturing the U-shaped glass tube shown in FIG. 2.

DESCRIPTION OF THE PREFERRED EMBODIMENT

An explanation of a bulb-shaped fluorescent lamp will be given below with reference to the figures of the low pressure mercury vapor discharge lamp according to the embodiment of the present invention.

Figure 1:
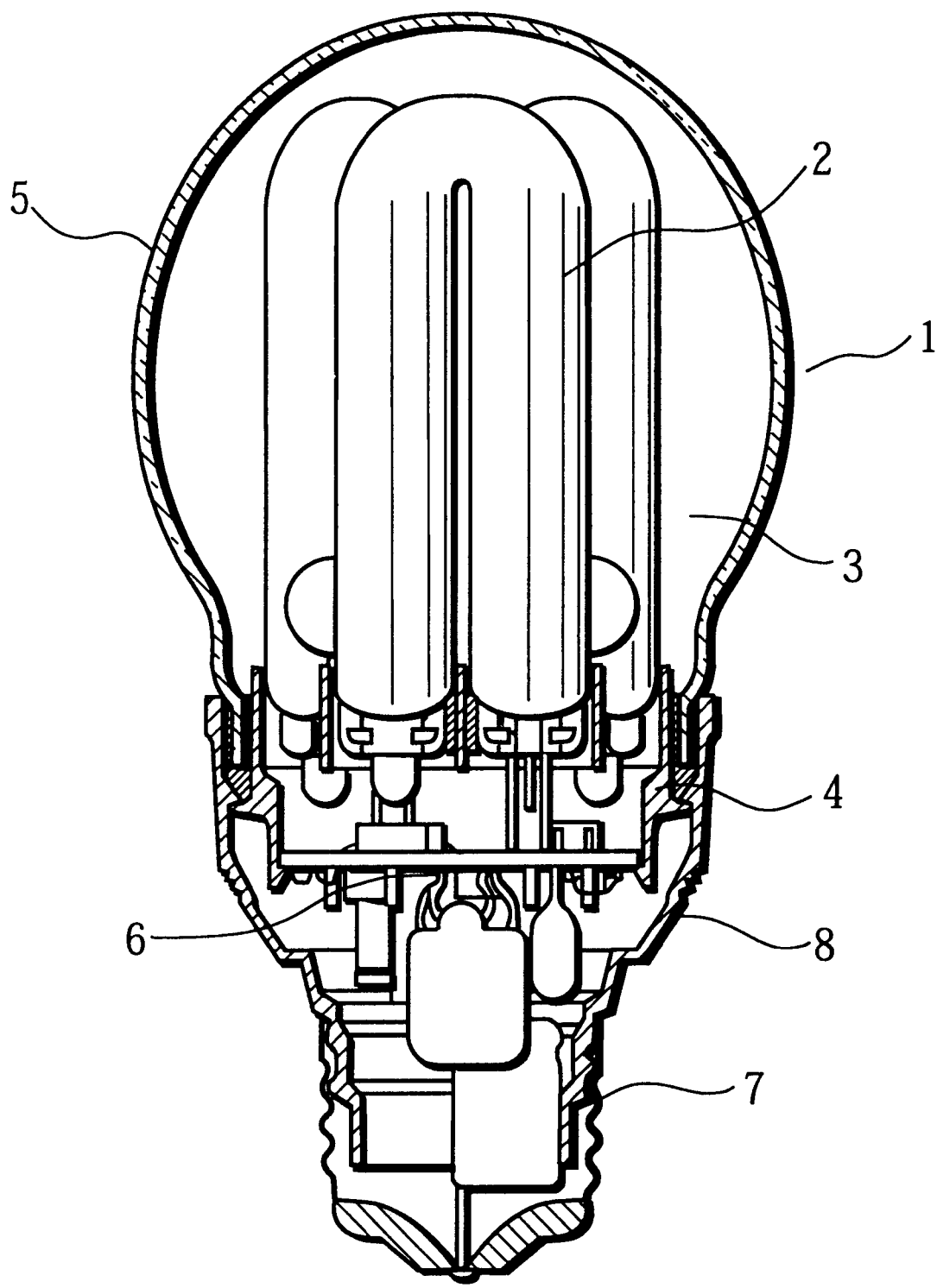
FIG. 1 is a partial cutaway front view of a bulb-shaped fluorescent lamp according to a preferable embodiment of the present invention.

FIG. 1 shows a bulb-shaped fluorescent lamp 1 that consumes 13 W of power and has 122 mm of with an entire length, for instance. The bulb-shaped fluorescent lamp 1 includes an arc tube 3 that is a plurality of connected U-shaped glass tubes 2. In the arc tube 3, one discharge path is formed. Each of the U-shaped glass tubes 2 is provided with a fluorescent layer at the internal surface. The arc tube 3 is provided with a pair of electrodes (not illustrated) at the ends. The arc tube 3 is held by a holder 4 and is enclosed in a globe 5. A lighting circuit 6 is connected to the arc tube 3. The lighting circuit 6 and the holder 4 are enclosed in a case 8 having a lamp cap 7. The globe 5 and the case 8 integrally form a housing.

Figure 2:
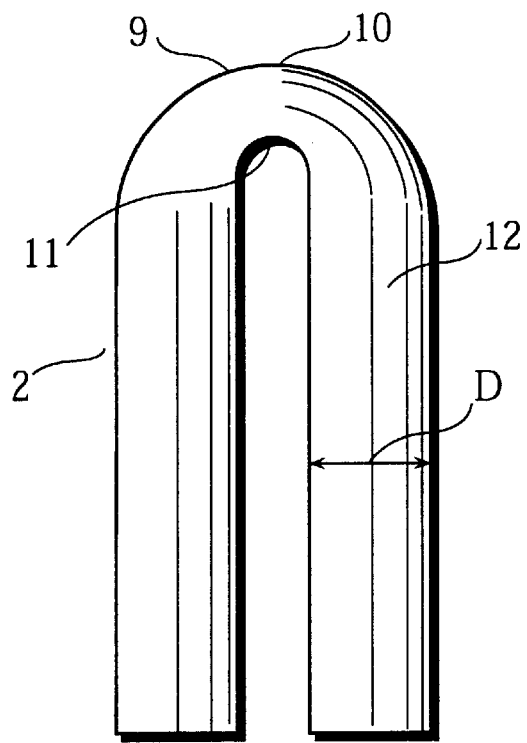
FIG. 2 is a front view of a U-shaped glass tube in the bulb-shaped fluorescent lamp according to the preferable embodiment of the present invention.
Figure 3:
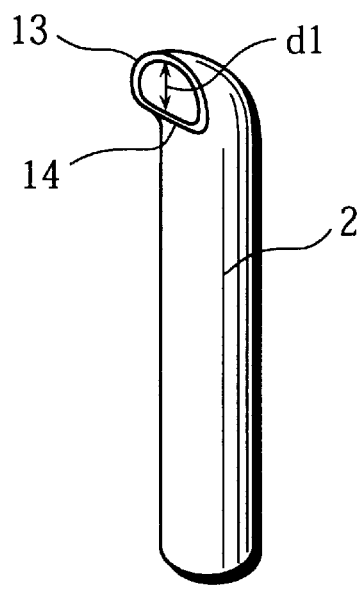
FIG. 3 is an expanded perspective cross section of a substantial part of the U-shaped glass tube.

FIG. 2 shows the U-shaped glass tube 2 that is an element of the arc tube 3. The outline of the sectional face at a bent part 9 of the U-shaped glass tube 2 includes a circular arc 13 and a gentle curve 14 as shown in FIG. 3. As shown in FIG. 2, the gentle curve 14 is substantially a chord.

Figure 7:
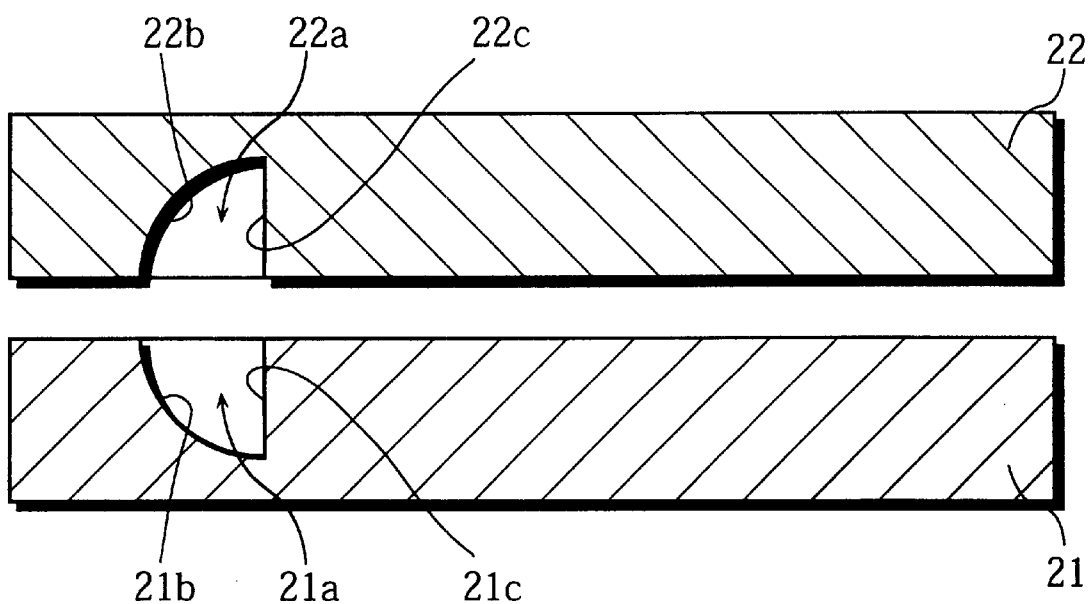
FIG. 7 is a sectional view of a mold used in manufacturing a glass tube.

The method of manufacturing a glass tube with the bent part 9 having the sectional face an outline of which includes the circular arc 13 and the gentle curve 14 is shown in FIG. 6. First, the central region of a straight glass tube 2A is heated and soften (FIG. 6A). Then, the glass tube 2A is bent to be a U-shaped one using an appropriate tool and is fit into a groove 21a of a lower mold 21 (FIG. 6B). Next, the glass tube 2A is covered by an upper mold 22. Then, air is injected from the ends of the glass tube 2A so as to inflate the softened glass tube 2A until the external wall of the glass tube comes into contact with the grooves on the upper and lower molds 21 and 22. (FIG. 6C). In this case, the outline of the sectional face of the space that is formed inside of the grooves on the upper and lower molds 21 and 22 at a part corresponding to the bent part 9 of the glass tube includes circular arcs 21b and 22b and gentle curves 21c and 22c as shown in FIG. 7. The soften glass tube that has been fit into the grooves is to have the outer shape that is the same as the shape of the space inside of the grooves. Note that only the bent part 9 of a glass tube can be fit into the upper and lower molds 21 and 22.

Figure 5:
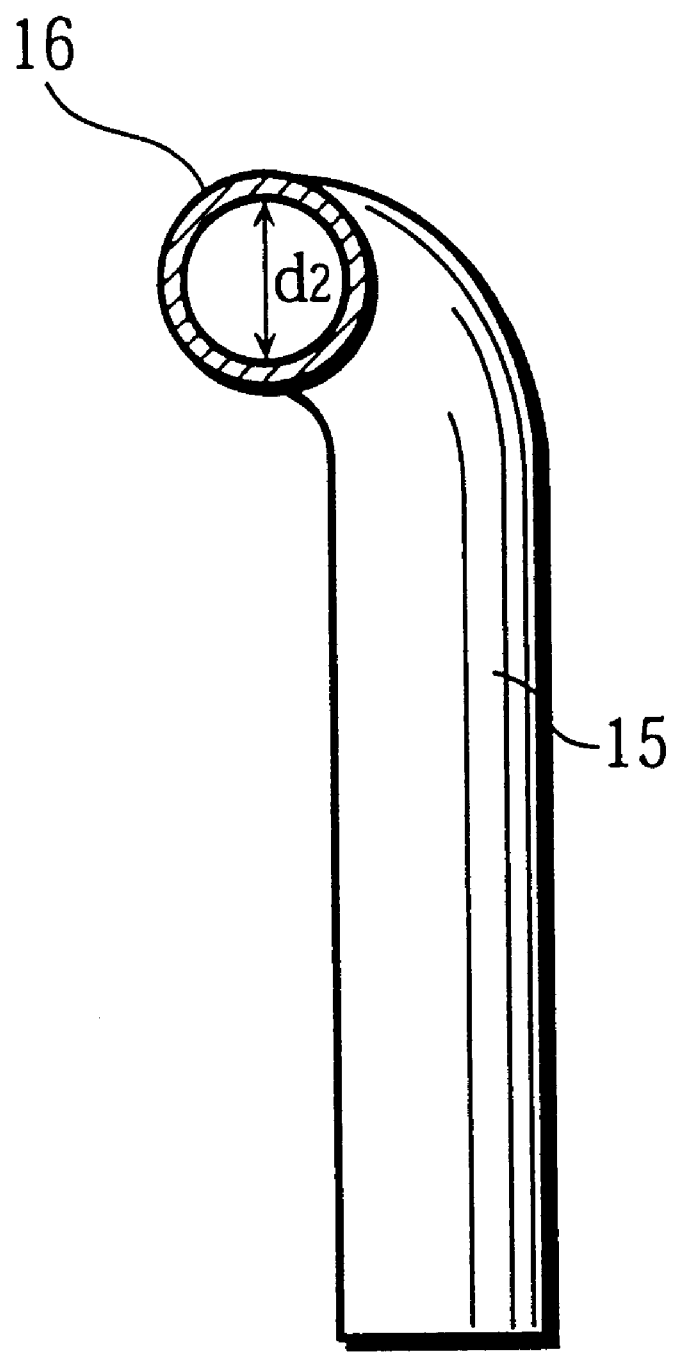
FIG. 5 is a perspective cross section at a bent part of a conventional U-shaped glass tube.

Here, the fluorescent lamp according to the present invention, the manufacturing method of which has been described, is compared with the conventional fluorescent lamp. The outline of the sectional face at the bent part of a U-shaped glass tube 15 of the conventional fluorescent lamp includes a circle 16 as shown in FIG. 5.

On the other hand, the outline of the sectional face at the bent part 9 of the U-shaped glass tube of the fluorescent lamp according to the present invention includes the circular arc 13 and the gentle curve 14. Accordingly, a shortest internal diameter d1 of the sectional face at the bent part 9, i.e., the distance between the summit 10 of the circular arc 13 and the summit 11 of the gentle curve 14 according to the present invention is shorter than the internal diameter d2 of the circle 16 of the conventional fluorescent lamp. As a result, the distance between the ends along the inner curve of the U shape of the glass tube according to the present invention is long compared with the conventional fluorescent lamp since one of the curves that is included in the outline of the sectional face of the U-shaped glass tube 2 at the bent part 9 is the gentle curve 14. More specifically, the inter-electrode distance, i.e., the discharge distance, or the length of the central axis of the discharge in the U-shaped glass tube is increased. Accordingly, the entire discharge distance is increased in the arc tube that is formed by connecting a plurality of U-shaped glass tubes, each of which has a sectional face outline including the circular arc 13 and the gentle curve 14 at the bent part 9. As a result, the luminous efficiency can be improved without upsizing the arc tube.

According to the present invention, the discharge distance in one U-shaped glass tube is increased by two times the newly extended length of a straight part 12. As a result, when a plurality of U-shaped glass tubes are connected, the entire discharge distance is increased by the product of the newly extended discharge distance per U-shaped glass tube and the number of the U-shaped glass tubes compared with the conventional fluorescent lamp.

Here, how much the discharge distance is increased when the U-shaped glass tube 2 is used will be calculated taking an example.

When the ratio d1/D, i.e., the ratio of the shortest internal diameter d1 (mm) of the sectional face of the U-shaped glass tube 2 at the bent part 9 to the internal diameter D (mm) of the U-shaped glass tube 2 at the straight part 12 is 7/10, i.e., 0.7, the discharge distance is increased by 6 mm per glass tube. As a result, when three U-shaped glass tubes of this kind are connected, the inter-electrode distance, i.e., the discharge distance can be increased by 18 mm without upsizing the arc tube. Note that the discharge distance of the fluorescent lamp according to the present invention is 301 mm and the luminous flux is 7841 m (lumen).

For the conventional fluorescent lamp, the outline of the sectional face of the U-shaped glass tube at the bent part is a circle, so that the ratio d1/D is "1". The entire discharge distance of the conventional fluorescent lamp is 283 mm and the luminous flux is 7541 m.

Figure 4:
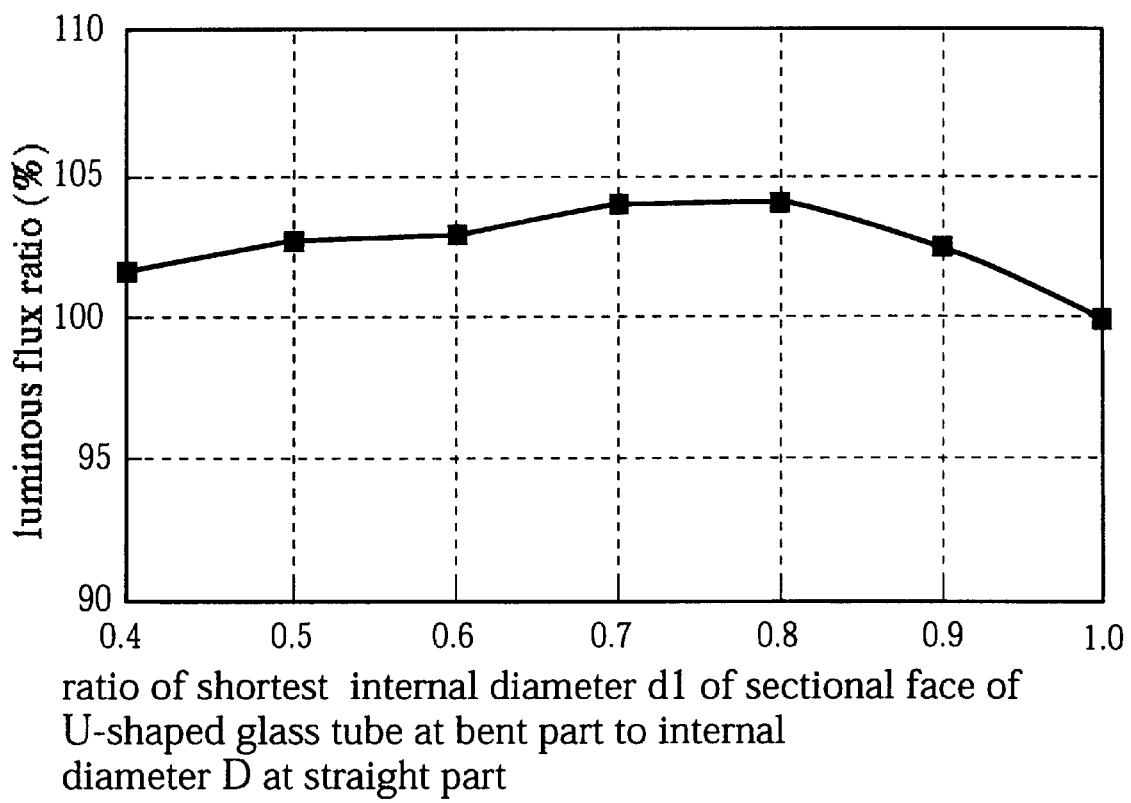
FIG. 4 shows the relationship between a ratio d1/D and luminous flux ratio when 100 hours has elapsed since bulb-shaped fluorescent lamps were lit.

FIG. 4 shows the relationship between the luminous flux ratio and the ratio d1/D when 100 hours has elapsed since fluorescent lamps were lit.

Suppose that the value of the ratio d1/D is "1" as in the case of the conventional fluorescent lamp and the value of the luminous flux is 100, the luminous flux is 102.5, 104.1, 103.9, 102.9, and 102.7 when the value of the ratio d1/D is 0.9, 0.8, 0.7, 0.6, and 0.5.

For the fluorescent lamp according to the present invention, which shows the highest luminous flux ratio and has the ratio d1/D value 0.8, the luminous flux ratio rises by 4.1% and the luminous flux value is increased by 321 m as the measured value compared with the conventional fluorescent lamp. Also, for the fluorescent lamp that has the d1/D value 0.9, the luminous flux ratio and the measured value rise.

When 1000 hours has elapsed since the fluorescent lamps were lit, however, the luminous flux ratio falls for the fluorescent lamp with the d1/D value 0.5. It is assumed that the exothermic heat at the bent part 9 is increased and the fluorescent layer around the bent part 9 deteriorates since the load on the lamp is increased due to the narrower discharge path at the bent part 9.

As a result, a U-shaped glass tube that satisfies 0.5<d1/D≦0.9 (where the shortest internal diameter at the bent part 9 is d1 and the internal diameter at the straight part is D) can improve the luminous efficiency of a bulb-shaped fluorescent lamp without upsizing the fluorescent lamp.

Note that while the present invention is applied to a bulb-shaped fluorescent lamp in the present embodiment, the present invention can be applied to an arc tube without any lamp cap and any lighting circuit and to a discharge lamp having one U-shaped glass tube.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A low pressure mercury vapor discharge lamp comprising a U-shaped glass tube having two straight legs and a smoothly curved bend, the bend having a cross-section with an interior curve and an exterior curve, where the interior curve is a gentle curve and the exterior curve is a circular arc having a substantially uniform radius.

2. The low pressure mercury vapor discharge lamp according to claim 1, wherein the gentle curve is approximately a chord.

3. The low pressure mercury vapor discharge lamp according to claim 2, where the bend further comprises a shortest internal diameter of d1 and where the two straight legs have an internal diameter of D and where a ratio of d1/D is $0.5 < d1/D \leq 0.9$.

4. A low pressure mercury vapor discharge lamp, comprising a plurality of U-shaped tubes, where the U-shaped glass tubes are connected to form a discharge path;

each U-shaped tube having two straight legs and a smoothly curved bend with an interior curve and an exterior curve, where the interior curve is a gentle curve and the exterior curve is a circular arc having a substantially uniform radius.

5. The low pressure mercury vapor discharge lamp according to claim 4, wherein the U-shaped glass tubes have the same sectional face outline at bent parts.

6. In a low pressure mercury vapor lamp, the improvement comprising:

an arc tube having a plurality of connected U-shaped glass tubes with a fluorescent layer provided at an internal surface of each U-shaped glass tube, each glass tube a circular cross-sectional pair of straight leg portions connected with a curved portion wherein an internal dimension of the glass tube at a center of the curved portion fulfills the following condition:
$0.5 < d1/D \leq 0.9$ wherein d1 is the interior cross-sectional distance at the center of the glass tube curved portion and D is a diameter of the glass tube on straight leg portions of the U-shaped tube; and wherein a discharge distance is approximately 301 mm.

7. A low pressure mercury vapor discharge lamp comprising a U-shaped glass tube having a smoothly curved bend and two straight leg portions;

the bend having a cross-section with an interior curve and an exterior curve, the interior curve being a gentle curve; and, where the smoothly curved bend has a shortest internal diameter of d1 and where the two straight legs have an internal diameter of D and where a ratio of d1/D is $0.5 < d1/D < 0.8$, wherein the exterior curve is a circular arc having a substantially uniform radius.

8. A low pressure mercury vapor discharge lamp comprising a U-shaped glass tube having a smoothly curved bend and two straight leg portions;

the bend having a cross-section with an interior curve and an exterior curve, the interior curve being approximately a chord; and, where the smoothly curved bend has a shortest internal diameter of d1 and where the two straight legs have an internal diameter of D and where a ratio of d1/D is $0.5 < d1/D < 0.8$, wherein the exterior curve is a circular arc having a substantially uniform radius.

9. A low pressure mercury vapor discharge lamp, comprising:

a plurality of U-shaped glass tubes, wherein the U-shaped glass tubes are connected and form a discharge path;

at least one U-shaped glass tube having a smoothly curved bend and two straight leg portions; the bend having across-section with an interior curve and an exterior curve, the interior curve being a gentle curve; where the bend has a shortest internal diameter of d1 and where the two straight legs have an internal diameter of D and where a ratio of d1/D is $0.5 < d1/D < 0.8$, a holder for holding an arc tube;

a lighting circuit for applying lighting voltage to the arc tube held by the holder between ends of the discharge path; and a lamp cap that is integrated with the holder, the lamp cap connecting the lighting circuit to an external power, wherein the exterior curve is a circular arc having a substantially uniform diameter.

10. A low pressure mercury vapor discharge lamp comprising:

a plurality of U-shaped glass tubes, wherein the U-shaped glass tubes are connected and form a discharge path;

at least one U-shaped glass tube having a smoothly curved bend and two straight leg portions; the bend having a cross-section with an interior curve and an exterior curve of a circular arc of substantially uniform diameter, the interior curve being a gentle curve; where the bend has a shortest internal diameter of d1 and where the two straight legs have an internal diameter of D and where a ratio of d1/D is $0.5 < d1/D < 0.8$;

a holder for holding an arc tube;

a lighting circuit for applying lighting voltage to the arc tube held by the holder between ends of the discharge path; and a lamp cap that is integrated with the holder, the lamp cap connecting the lighting circuit to an external power, wherein the bend of each U-shaped glass tube has the same cross-section.

* * * * *